United States Patent
Hay et al.

(10) Patent No.: US 7,309,518 B2
(45) Date of Patent: *Dec. 18, 2007

(54) RADIAL TILT REDUCED MEDIA

(75) Inventors: Grant Hay, Evansville, IN (US); Azar Alizadeh, Wilton, NY (US); Wit Bushko, Niskayuna, NY (US); Irene Dris, Clifton Park, NY (US); Thomas Feist, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 377 days.

This patent is subject to a terminal disclaimer.

(21) Appl. No.: 11/102,068

(22) Filed: Apr. 8, 2005

(65) Prior Publication Data

US 2005/0202201 A1    Sep. 15, 2005

Related U.S. Application Data

(63) Continuation of application No. 10/024,349, filed on Dec. 18, 2001.

(60) Provisional application No. 60/316,126, filed on Aug. 30, 2001, provisional application No. 60/279,887, filed on Mar. 29, 2001.

(51) Int. Cl.
*B32B 3/02* (2006.01)

(52) U.S. Cl. ............... 428/64.1; 428/64.4; 430/270.11; 369/283; 369/288

(58) Field of Classification Search ............... 428/64.1, 428/64.4, 457, 913; 430/270.11, 495.1, 945; 369/283, 288
See application file for complete search history.

(56) References Cited

U.S. PATENT DOCUMENTS

| 4,217,438 A | 8/1980 | Brunelle et al. | 528/202 |
| 4,373,065 A | 2/1983 | Prest, Jr. | 525/132 |
| 4,441,179 A | 4/1984 | Slaten | 369/275 |
| 4,680,211 A | 7/1987 | Evans et al. | 428/65 |
| 4,719,594 A | 1/1988 | Young et al. | 365/113 |
| 4,845,142 A | 7/1989 | Niwano et al. | 524/287 |
| 4,889,756 A | 12/1989 | Barzynski et al. | 428/64 |
| 4,954,591 A | 9/1990 | Belmares | |

(Continued)

FOREIGN PATENT DOCUMENTS

EP     0 225 801 B2     12/1986

(Continued)

OTHER PUBLICATIONS

JP61063942. Publication Date Apr. 2, 1986 "Optical Information Recording Disk" Abstract Only.

(Continued)

*Primary Examiner*—Elizabeth Mulvaney
(74) *Attorney, Agent, or Firm*—Cantor Colburn LLP (57) ABSTRACT

A storage media can comprise: a plastic substrate, an optical layer, a reflective layer disposed between the optical layer and the substrate, and an adhesive layer disposed between the optical layer and the reflective layer. The optical layer can have an optical layer composition different from the substrate composition. The storage media has a radial deviation over time of less than or equal to 1.15 degrees at a radius of 55 mm, when exposed to a cycle at 25° C. of 50% relative humidity—90% relative humidity—50% relative humidity.

24 Claims, 7 Drawing Sheets

U.S. PATENT DOCUMENTS

| | | | |
|---|---|---|---|
| 4,957,776 A | 9/1990 | Higuchi et al. | 427/54.1 |
| 4,987,194 A | 1/1991 | Maeda et al. | 525/314 |
| 5,053,288 A | 10/1991 | Hashimoto et al. | 428/694 |
| 5,135,791 A | 8/1992 | Imai et al. | 428/65 |
| 5,312,663 A | 5/1994 | Kosinski et al. | 428/64 |
| 5,586,110 A | 12/1996 | Nakaki | 369/286 |
| 5,609,990 A | 3/1997 | Ha et al. | 430/270.11 |
| 5,635,278 A | 6/1997 | Williams | |
| 5,863,997 A | 1/1999 | Smith | |
| 5,942,290 A | 8/1999 | Leppard et al. | |
| 6,025,114 A | 2/2000 | Popat et al. | |
| 6,042,919 A | 3/2000 | Gorsuch | 428/64.1 |
| 6,066,218 A | 5/2000 | Kuhn et al. | |
| 6,128,274 A | 10/2000 | Mori et al. | |
| 6,183,829 B1 | 2/2001 | Daecher et al. | 428/64.1 |
| 6,214,433 B1 | 4/2001 | Tronche et al. | |
| 6,316,071 B1 | 11/2001 | Chosa et al. | |
| 6,475,589 B1 | 11/2002 | Pai-Paranjape et al. | |
| 6,489,376 B1 | 12/2002 | Khudyakov et al. | |
| 6,645,596 B1 | 11/2003 | Murakami et al. | 428/64.1 |
| 6,667,952 B2 | 12/2003 | Komaki et al. | |
| 6,716,505 B2 * | 4/2004 | Dris et al. | 428/64.1 |
| 6,775,838 B2 | 8/2004 | Komaki et al. | |
| 6,893,700 B2 * | 5/2005 | Dris et al. | 428/64.1 |
| 6,924,017 B2 | 8/2005 | Shoji | 428/64.1 |
| 7,029,742 B2 * | 4/2006 | Dris et al. | 428/64.1 |
| 2002/0048691 A1 | 4/2002 | Davis et al. | 428/694 |
| 2002/0094455 A1 | 7/2002 | Feist et al. | 428/694 |
| 2002/0197438 A1 * | 12/2002 | Hay et al. | 428/64.4 |
| 2002/0197441 A1 | 12/2002 | Hariharan et al. | 428/65.1 |
| 2003/0044564 A1 | 3/2003 | Dris et al. | 428/64.4 |
| 2003/0198774 A1 | 10/2003 | Dris et al. | 428/64.1 |
| 2004/0063031 A1 | 4/2004 | Gallucci et al. | 430/270.11 |
| 2005/0117405 A1 | 6/2005 | Dris et al. | 365/189.05 |
| 2005/0129953 A1 | 6/2005 | Breitung et al. | 428/411.1 |
| 2005/0180284 A1 | 8/2005 | Hay et al. | 369/53.21 |
| 2005/0233151 A1 | 10/2005 | Feist et al. | 428/421 |

FOREIGN PATENT DOCUMENTS

| | | |
|---|---|---|
| EP | 0 271 000 B1 | 12/1987 |
| EP | 0 295 891 A2 | 6/1988 |
| EP | 0 303 209 A2 | 8/1988 |
| EP | 0 395 369 B1 | 4/1990 |
| EP | 0 467 705 B1 | 7/1991 |
| EP | 0 642 124 B1 | 9/1994 |
| EP | 0 691 361 B1 | 6/1995 |
| EP | 0 724 259 A2 | 1/1996 |
| EP | 0 896 328 B1 | 7/1998 |
| EP | 1 047 055 A1 | 4/1999 |
| EP | 1 031 972 A2 | 2/2000 |
| EP | 1 130 587 A2 | 3/2001 |
| EP | 1 271 499 A2 | 6/2002 |
| EP | 1 321 930 A1 | 6/2003 |
| JP | 63-13722 | 1/1988 |
| JP | 63-56832 | 3/1988 |
| JP | 6356832 | 3/1988 |
| WO | WO 98/20555 | 5/1998 |
| WO | WO 99/59143 | 11/1999 |
| WO | WO 01/11618 A1 | 2/2001 |
| WO | WO 02/25376 A2 | 3/2002 |
| WO | WO 03/052757 A1 | 6/2003 |

OTHER PUBLICATIONS

JP62290734. Publication Date Dec. 17, 1987 "Base for Optical Recording Medium and its Production:" Abstract Only.

JP63124244. Publication Date May 27, 1988 "Optical Disk" Abstract Only.

JP63309547. Publication Date Dec. 16, 1988 "Optical Resin Molding" Abstract Only.

JP3281220. Publication Date Dec. 11, 1991 "Oriented Material" Abstract Only.

JP4321950. Publication Date Nov. 11, 1992 "Optical Disk" Abstract Only.

JP8055341. Publication Date Feb. 27, 1996 "Optical Disk Medium and Optical Disk Device" Abstract Only.

JP9035330. Publication Date Feb. 7, 1997. "Optical Disk and Production of Optical Disk" Abstract Only.

JP02183443A; Publication Date: Jul. 18, 1990; "Optical Recording Medium"; Abstract Only.

JP9054982. Publication Date Feb 25, 1997 "Optical Disk Substrate and its Production" Abstract Only.

JP2001060338. Publication Date Mar. 6, 2001 "Optical Recording Medium" Abstract Only.

JP2001067726. Publication Date Mar. 16, 2001 "Optical Disk" Abstract Only.

"Modeling for Suppression of Moisture/Temperature Composite Structures With Perfect Bonding", Yiping Qui et al., Textile Res., vol. 68(1), pp. 1-9, 1988.

http://www.sony.net/sonyinfo/news/press/200202/02-0219e; Large Capacity Optical Disc Video Recording Format "Blu-ray Disc"; Feb. 19, 2002; 3 pages.

JP 63-056832; published Mar. 11, 1988; Magneto-Optical Disk Having Improved Environmental Resistance; Abstract only; 1 page.

* cited by examiner

RADIAL TILT REDUCED MEDIA

CROSS REFERENCE TO RELATED APPLICATION

This application is a continuation application of U.S. patent application Ser. No. 10/024,349 filed Dec. 18, 2001, and claims the benefit of U.S. Provisional Application Ser. No. 60/316,126 filed Aug. 30, 2001, and U.S. Provisional Application Ser. No. 60/279,887 filed Mar. 29, 2001, which are incorporated herein by reference.

BACKGROUND OF THE INVENTION

Optical, magnetic and magneto-optic media are primary sources of high performance storage technology that enables high storage capacity coupled with a reasonable price per megabyte of storage. Areal density, typically expressed as billions of bits per square inch of disk surface area (Gbits per square inch ($Gbits/in^2$)), is equivalent to the linear density (bits of information per inch of track) multiplied by the track density in tracks per inch. Improved areal density has been one of the key factors in the price reduction per megabyte, and further increases in areal density continue to be demanded by the industry.

In the area of optical storage, advances focus on access time, system volume, and competitive costing. Increasing areal density is being addressed by focusing on the diffraction limits of optics (using near-field optics), investigating three dimensional storage, investigating potential holographic recording methods and other techniques.

Conventional polymeric data storage media has been employed in areas such as compact disks (CD-ROM) and recordable or re-writable compact disks (e.g., CD-RW), and similar relatively low areal density devices, e.g., less than about 1 $Gbits/in^2$, which are typically optical devices requiring the employment of a good optical quality substrate having low birefringence.

Figure 1:
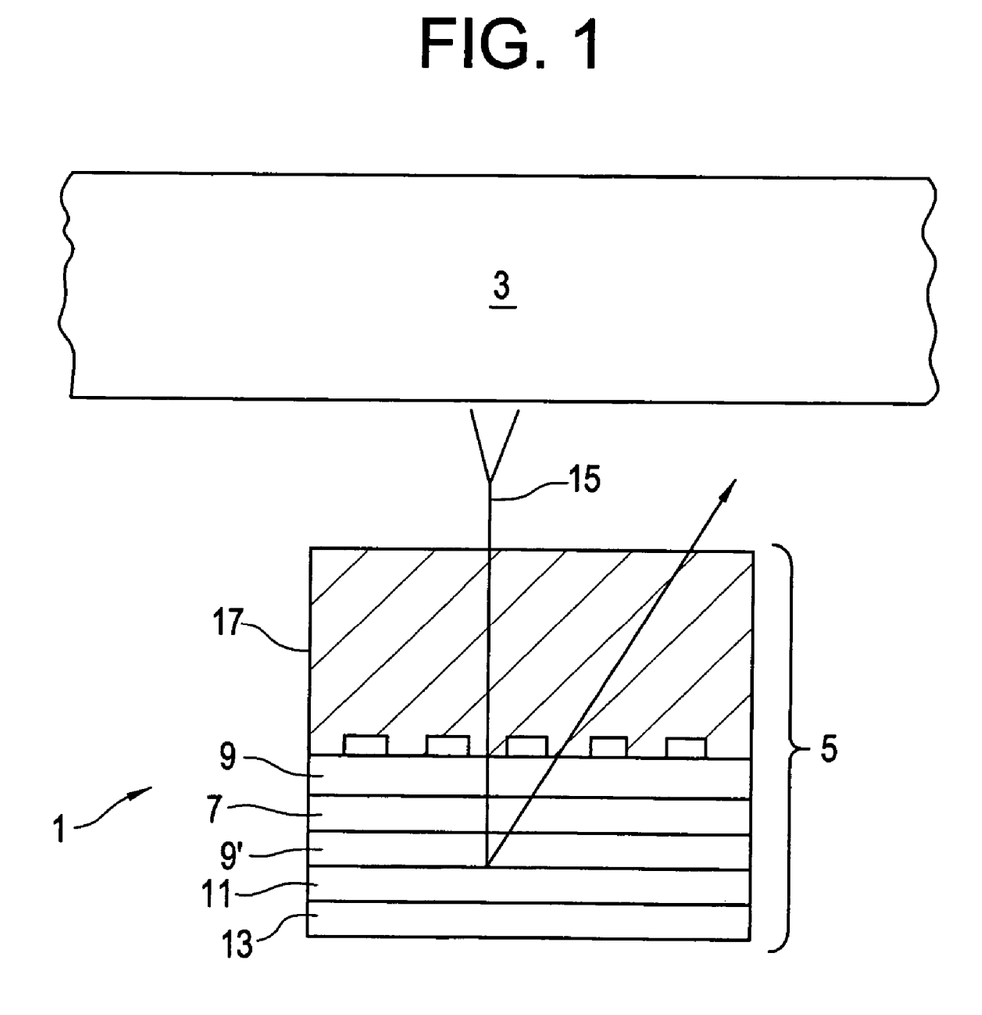
FIG. 1 is a cross-sectional illustration of a prior art low areal density system employing an optically clear substrate.

Referring to FIG. 1, a low areal density system 1 is illustrated having a read device 3 and a recordable or re-writable storage media 5. The storage media 5 comprises conventional layers, including a data layer 7, dielectric layers 9 and 9', reflective layer 11, and protective layer 13. During operation of the system 1, a laser 15 produced by the read device 3 is incident upon the optically clear substrate 17. The laser passes through the substrate 17, and through the dielectric layer 9, the data layer 7 and a second dielectric layer 9'. The laser 15 then reflects off the reflective layer 11, back through the dielectric layer 9', the data layer 7, the dielectric layer 9, and the substrate 17 and is read by the read device 3.

Conventionally, the above issues associated with employing first surface, including near field, techniques have been addressed by utilizing metal, e.g., aluminum, and glass substrates. These substrates are formed into a disk and the desired layers are disposed upon the substrate using various techniques, such as sputtering. Possible layers include reflective layers, dielectric layers, data storage layers and protective layers. Once the desired magnetic layers have been added, the disk may be partitioned into radial and tangential sectors through magnetic read/write techniques. Sector structure may also be added through physical or chemical techniques, e.g. etching, however this must occur prior to the deposition of the magnetic layers.

As is evident from the fast pace of the industry, the demand for greater storage capacities at lower prices, the desire to have re-writable disks, and the numerous techniques being investigated, further advances in the technology are constantly desired and sought.

BRIEF SUMMARY OF THE INVENTION

Disclosed herein is a storage media having a radial deviation of less than or equal to about 1.15 degrees at a radius of 55 mm. In one embodiment, the storage media can comprise: a plastic substrate, an optical layer, a reflective layer disposed between the optical layer and the substrate, and an adhesive layer disposed between the optical layer and the reflective layer. The optical layer can have an optical layer composition different from the substrate composition. The storage media has a radial deviation over time of less than or equal to 1.15 degrees at a radius of 55 mm, when exposed to a cycle at 25° C. of 50% relative humidity—90% relative humidity—50% relative humidity.

In another embodiment, the storage media can comprise: a plastic substrate, an optical layer, and an adhesive layer disposed between the optical layer and the plastic substrate. The optical layer can have an optical layer composition different from the substrate composition. The storage media can have a radial deviation over time of less than or equal to 1.15 degrees at a radius of 55 mm, when exposed to a cycle at 25° C. of 50% relative humidity—90% relative humidity—50% relative humidity; and can be capable of reflecting a particular energy field.

In yet another embodiment, a DVD can comprise: a plastic substrate, an optical layer, a reflective layer, and an adhesive layer disposed between the substrate and the optical layer. The plastic substrate can have a substrate thickness of about 0.3 mm to about 1.1 mm. The optical layer can have an optical layer composition different from the substrate composition, wherein at least one of the substrate composition and the optical layer composition comprises residues of 1,1-bis(4-hydroxy-3-methylphenyl)cyclohexane. The DVD has a radial deviation over time of less than or equal to 1.15 degrees at a radius of 55 mm, when exposed to a cycle at 25° C. of 50% relative humidity—90% relative humidity—50% relative humidity.

The above described and other features are exemplified by the following figures and detailed description.

DESCRIPTION OF THE DRAWINGS

Referring now to the drawings, wherein like elements are numbered alike.

DETAILED DESCRIPTION OF THE INVENTION

In this specification and in the claims that follow, reference will be made to a number of terms that shall be defined. For example, the singular forms "a", "an" and "the" include plural referents unless the context clearly dictates otherwise. "Optional" or "optionally" mean that the subsequently described event or circumstance may or may not occur, and that the description includes instances where the event or circumstance occurs and instances where it does not. "Tilt" as used herein refers to the degrees by which a material bends on a horizontal axis and is typically measured as the vertical deviation at the outer radius of the storage medium. The "maximum radial tilt range" as used herein is the disk curvature during absorption and subsequent desorption of water and is hence twice the radial tilt specification as usually specified by the developers in the industry.

High-density re-recordable optical media formats are being developed to replace existing VHS tape recorders for consumer entertainment consumption. The goal is to produce a removable media format approaching or even exceeding 20 gigabytes (GB) in storage and having data transfer rates of about 35 megabytes per second (MBps) and approaching or even exceeding 100 (MBps). Thinner readthrough mediums are required for these types of media with as thin as 80 micrometers currently are being developed. Most of the formats are asymmetric in structure with the above mentioned thin readthrough medium being supported by a thicker substrate. Curvature in the readthrough medium is induced by changes in the surrounding environment. Humidity and temperature changes will induce curvature into the total asymmetric structure and hence the readthrough medium. The curvature induces spherical aberrations that lead to poor performance of the optical drive. Disclosed below are ranges of material parameters and material parameter ratios for the substrate and film that lead to improved dimensional stability of the total structure. This technology minimizes curvature variation in the readthrough medium induced by environmental humidity changes.

Optical media format developers are currently moving towards re-recordable optical media formats that will replace the consumer VHS market. In these formats the areal density is increased by: adding extra information layers, decreasing laser wavelength, and/or increasing numerical aperture.

Both increasing the numerical aperture and decreasing the wavelength has a detrimental impact on the magnitude of the optical aberrations and hence read noise/errors. These aberrations are considerably sensitive to tilt of the optical medium. Materials utilized for manufacture of optical media generally adsorb water that in turn causes a volume change of the material better known as swell. Any asymmetry in the water absorption/swell will incur a bending moment within the media. Asymmetry in the water absorption in optical disks is caused by the need for impermeable metallic and inorganic layers adjacent to the information layer. The bending moment causes curvature in the media and hence the readthrough medium.

Disc curvature is determined by measuring a laser beam deflection off the disc surface. The angle of inclination from a flat horizontal disc is compared to the angle of inclination of the disc of interest; the difference in the angles is referred to as disc tilt. From geometrical considerations the laser beam deflection is equal to twice the disc tilt and is commonly referred to as radial deviation. The tilt range is defined as the maximum range in the tilt measured on a disc at a specific disc radius on both absorption and subsequent desorption of water.

To attain high areal densities in optical storage media the laser beam spot diameter (i.e., the diameter of the laser light beam that strikes the media) needs to be decreased. In the pure diffraction limited case the beam diameter is related to the numerical aperture and wavelength in the following way:

$$\text{Beam Spot Diameter} \propto \left[\frac{\lambda}{NA}\right]$$

where $\lambda$=wavelength $NA$=numerical aperture

In the optical media formats laser wavelength and/or numerical aperture may be altered to achieve the desired density increase. The inherent problem with moving to lower wavelengths and higher numerical apertures is the retrospective noise tolerance collapse; e.g., tilt tolerance, which is related to the above in the following way:

$$\text{Tilt Margin} \propto \left[\frac{\lambda}{d \cdot NA^3}\right]$$

where $d$=thickness of readthrough medium

In media formats being developed the thickness of the optical medium is being reduced, relative to current formats, to increase the disc tilt tolerance. This optical layer or optical film is then bonded to a thicker substrate for mechanical stability and final use in an optical drive. There are other instances where more than one of these optical layers is bonded together to obtain a multilayer format similar to the DVD format. The film is the optical medium and the information layer is on the injection-molded substrate. These thin optical mediums can be thought of as optical films.

Figure 2:
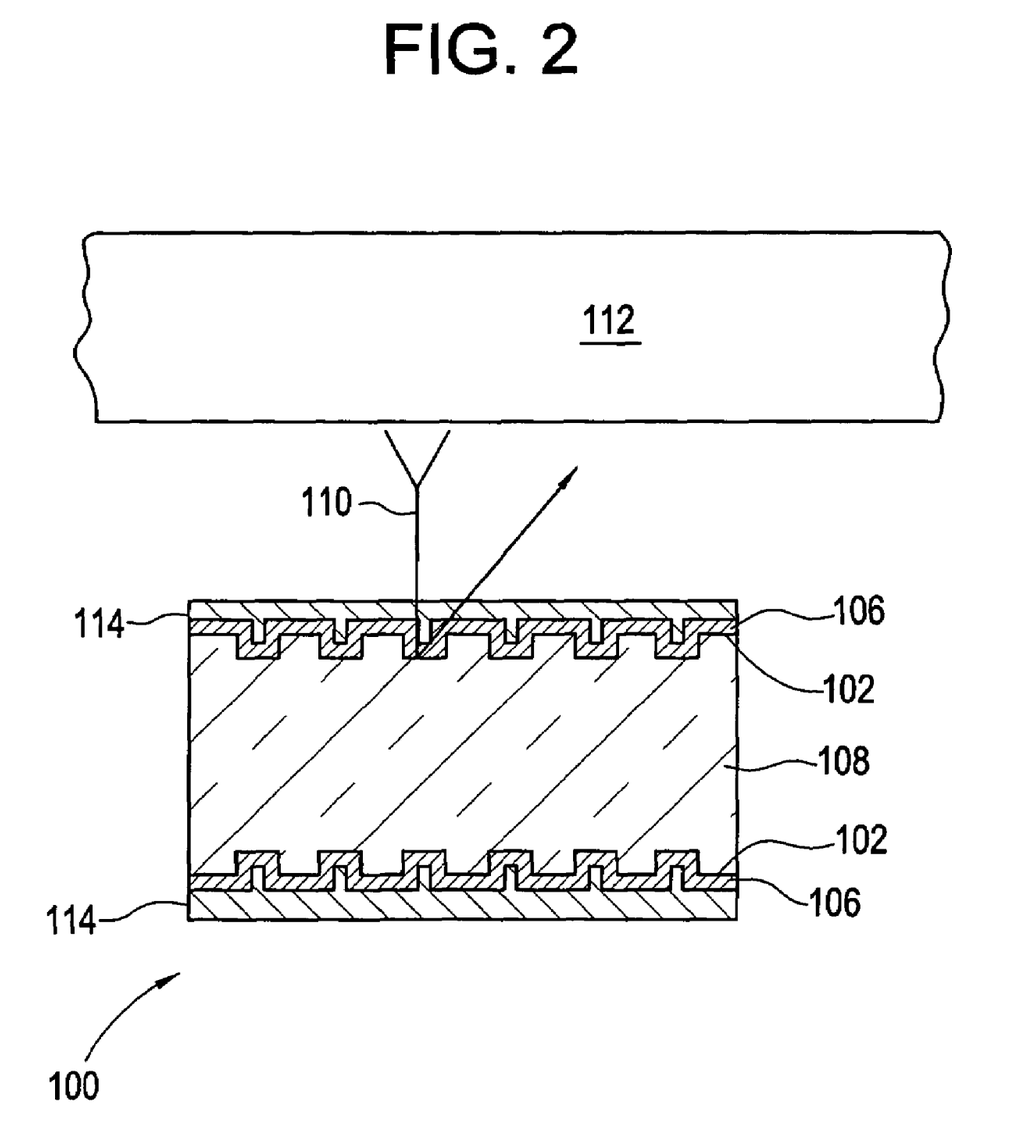
FIG. 2 is a cross-sectional illustration of a read/write system using one possible embodiment of a storage media with a light incident on the data storage layer without passing through the substrate, i.e., a first surface storage media.

Referring to FIG. 2, for example, data retrieval comprises contacting the data storage layer(s) 102 (e.g., surface features, phase change material, or organic dye) with a light beam 110 (white light, laser light, or other) incident on such layer(s). A reflective layer (not shown), disposed between the data storage layer 102 and substrate 108, reflects the light back through the data storage layer 102, adhesive layer 106, optical layer 114, and to the read/write device 112 where the data is retrieved.

Assuming that the structure is an elastic plate that extends infinitely in the in-plane directions and that the material properties are not a function of thickness then the isotropic strain due to water absorption is given by the below expression:

$$\overline{\varepsilon}(t) = \frac{\beta}{l} \int_{l/2}^{-l/2} c(z, t) \, dz$$

where $\epsilon$=strain
z=thickness direction
l=thickness
c=concentration
$\beta$=swell coefficient where $\epsilon(t)=\beta c(z,t)$ The curvature of the substrate is related to the first moment of the water distribution in the disk as shown below:

$$\kappa(t) = \frac{12\beta}{l} \int_{l/2}^{-l/2} c(z,t) z \, dz$$

Figure 3:
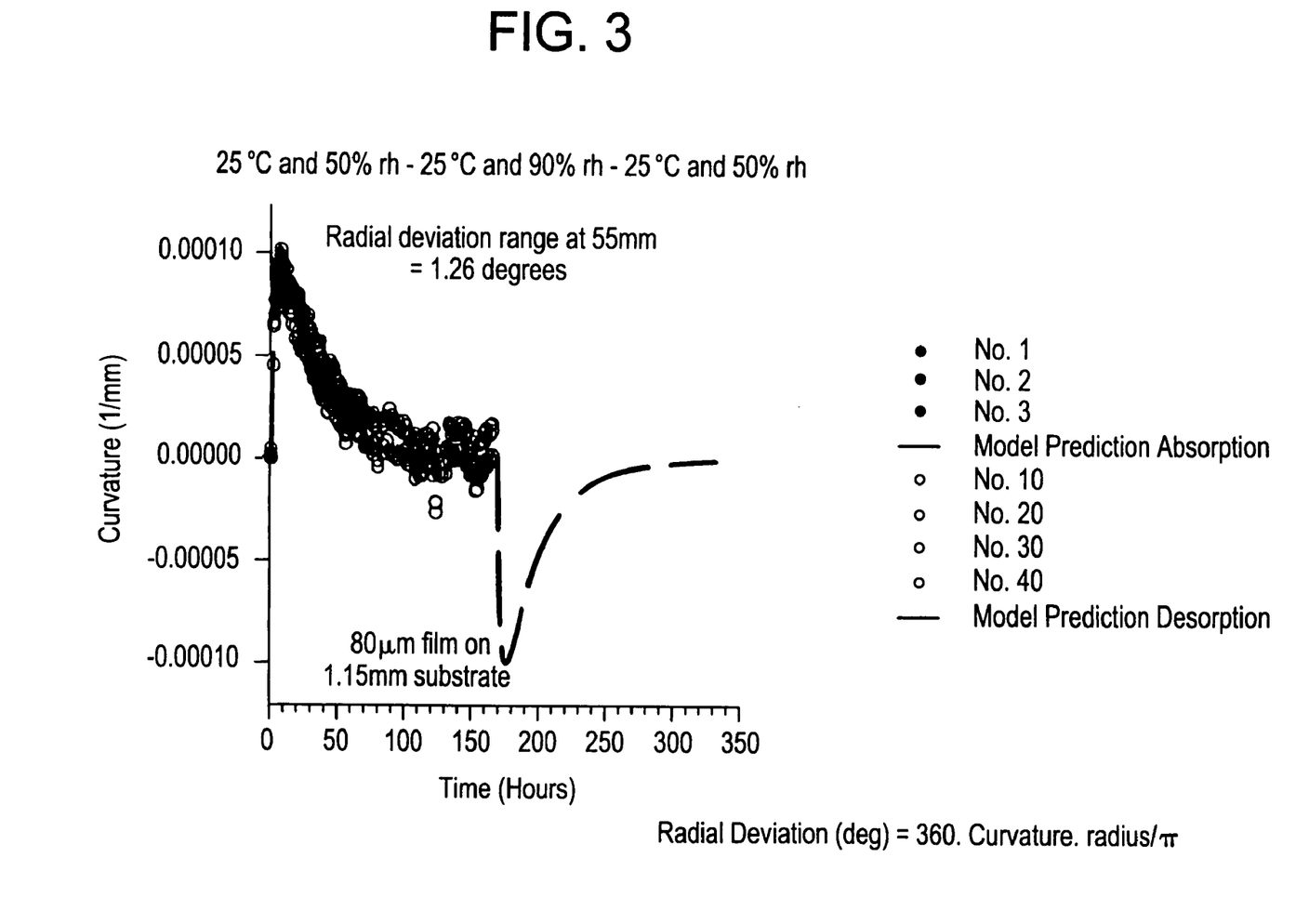
FIG. 3 is a graphical illustration of curvature change induced by a humidity set from 25° C. and 50% relative humidity (rh) to 25° C. and 90% rh for two matched systems with different bonding schemes (i.e., PSA and ultraviolet (UV) curable adhesive).

For multiple layer systems the above integrals are summations of integrals across the specific layer thicknesses including material parameters for each layer. The concentration of water as a function of thickness and time c(z,t) is calculated from a solution to the diffusion equation. In the case of a two layer system the time dependant curvature change induced by a set humidity change is given by the below general expression:

$$\kappa(t) - \kappa(0) = \frac{6\Delta\phi\beta_1 s_1}{l_1} f(t; \rho, \gamma, \delta, q)$$

where $t$ = time $\Delta\phi$ = change in relative humidity $\rho = \dfrac{l_2}{l_2}$ = ratio of layer thickness, $\gamma = \dfrac{\frac{E_2}{1-v_2}}{\frac{E_1}{1-v_1}}$ = ratio of mechanical stiffness, $\delta = \dfrac{\beta_2 s_2}{\beta_1 s_1} = \dfrac{\varepsilon_2^\infty}{\varepsilon_1^\infty}$ = ratio of water strains, $q = \dfrac{D_2}{D_1}$ = ratio of diffusivities subscript "2" refers to the film and subscript "1" refers to the substrate If all of the material parameters are supplied, the two layer structure dynamic curvature change can be determined. FIG. 3 exhibits validation with the above mathematical description and experimental data on: a matched optical film/substrate polycarbonate system (e.g., a system comprising a polycarbonate optical film and a polycarbonate substrate) that under went a step in environmental humidity. Meanwhile, FIG. 4 exhibits further validation on three different systems with various bonding layers and both matched and mismatched systems.

Optical media manufacturers specify upper and lower specification limits on structure curvature. This requires that the substrate curvature falls within these specification limits at all times during any environmental humidity change. The curvature range (FIG. 5) during an absorption and subsequent desorption should be minimized. There are three ways to reduce the curvature range: (1) reduce the swell/strain of the substrate on absorption of water, (2) select a film that minimizes the curvature dynamic of the structure, and (3) change the film thickness. An explanation of how to reduce the curvature or tilt range of a single layer substrate or a dual layer system by selecting materials with reduced swell/strain on absorption of water is set forth in commonly assigned U.S. Pat. Ser. No. 09/943,767.

The maximum in the dynamic curvature on absorption and desorption of water for a single substrate is given by the following relation:

$$\kappa(t) - \kappa(0) = \frac{6\Delta\phi\beta_1 s_1}{l_1}$$

This shows that reducing the solubility and swell coefficient of the material can minimize the pure substrate tilt. Consequently, an optical film is chosen to minimize system curvature. The curvature can be converted into a tilt and the maximum tilt range experienced by the structure on sorption and subsequent desorption is given by the below expression:

$$\text{Max Radial Tilt Range(rad)} = \kappa t = \frac{1.92\Delta rh \beta sr}{t} = \frac{1.92\Delta rh \varepsilon r}{t}$$

where:
$\kappa$ is the curvature (length$^{-1}$);
$\Delta rh$ is step relative humidity;
$\beta$ is strain/mass fraction water at a given temperature(T);
s is mass fraction water at relative humidity (rh)=1 and T;
$\epsilon=\beta s$ is water strain at rh=1 and T;
t is substrate thickness; and
r is radius of interest.

The "maximum radial tilt range" as used herein is the disk curvature during absorption and subsequent desorption of water and is hence twice the radial tilt specification as usually specified by the developers in the industry.

Figure 4:
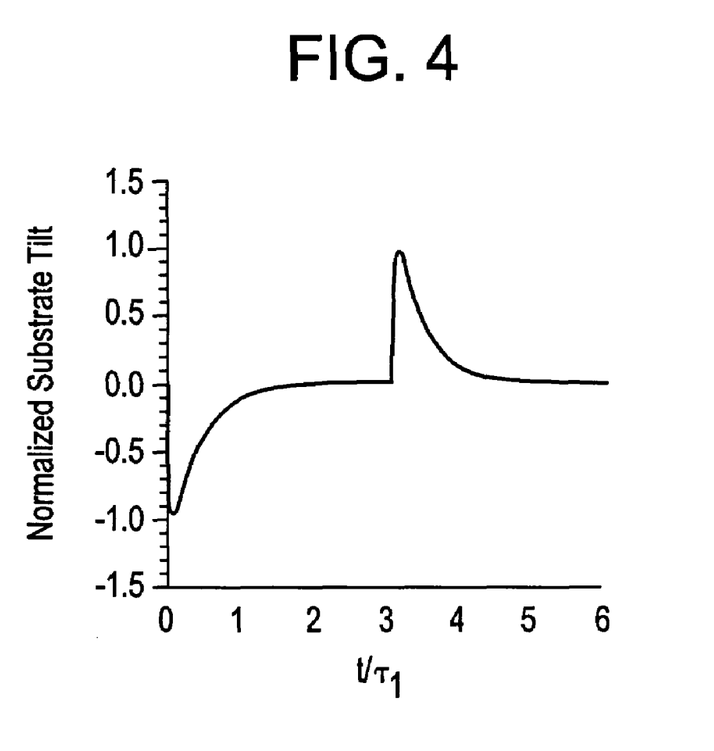
FIG. 4 is a graphical illustration of dynamic curvature of a substrate during desorption and adsorption.

FIG. 4 outlines the dynamic curvature in absorption and subsequently in desorption normalized by $$\frac{6\Delta\phi\beta_1 s_1}{l_1}$$

hence arriving at a value of one and minus one at the maximum and minimum respectively for a substrate without film. By adding a film comprising a different chemical composition than the substrate, the asymmetry can be reduced, hence reducing the value of the maximum tilt.

Figure 5:
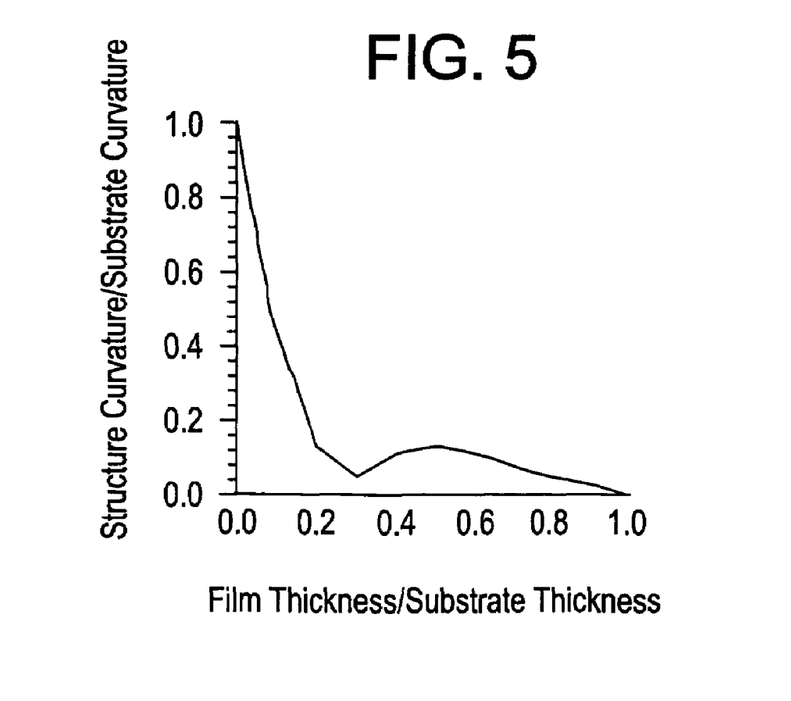
FIG. 5 is a graphical illustration of the effect of thickness on structure curvature range during absorption and subsequent desorption.

As the thickness of the optical film (matching film and mismatched film) is increased, the maximum tilt will also reduce to the point where there is no tilt for a film of the same thickness as the substrate (e.g., DVD, DVR (digital video recordings), and the like). FIG. 5 exhibits the behavior of the curvature range with the thickness ratio where the film and substrate are the same material. It was disclosed that by having a matched film that is approximately 30% of the thickness of the substrate, the tilt of the coated substrate can be reduced to 5% of that of a substrate without a film. Additionally at an optical film (layer) thickness of about 20% of the substrate thickness the tilt reduction is down to 10% of the substrate tilt. This curvature dependence on thickness is stronger than the tilt tolerance reduction caused by aberrations dependence on thickness. Consequently, by having an optical film thickness of greater than or equal to about 18% of the substrate thickness, the tilt can be reduced by greater than or equal to about 80%, with a reduction in tilt of greater than or equal to about 90% obtained with an optical film thickness of greater than or equal to about 20% of the substrate thickness. Preferably, the optical film thickness is about 20% to about 40% of the substrate thickness, with a thickness of about 25% to about 35% of the substrate thickness preferred.

If the thickness of the film is fixed then material properties of the film can be optimized to reduce the tilt range. By mismatching the material of the film to that of the substrate, the tilt range can also be reduced. For example, Table 1 gives ratios of parameters for a disc system (100 micrometer (μm) film and 1.1 millimeter (mm) substrate) that lead to a curvature range that is 11% that of the substrate curvature range. This is a four fold improvement over a matched film/substrate system for a given thickness.

TABLE 1

| Ratios | | Value |
|---|---|---|
| Thickness | ρ | 0.09 |
| Stiffness | γ | 3 |
| Swell | δ | 1.01 |
| Diffusivity | q | 0.15 |
| Minimum Range | | 0.11 |

Figure 6:
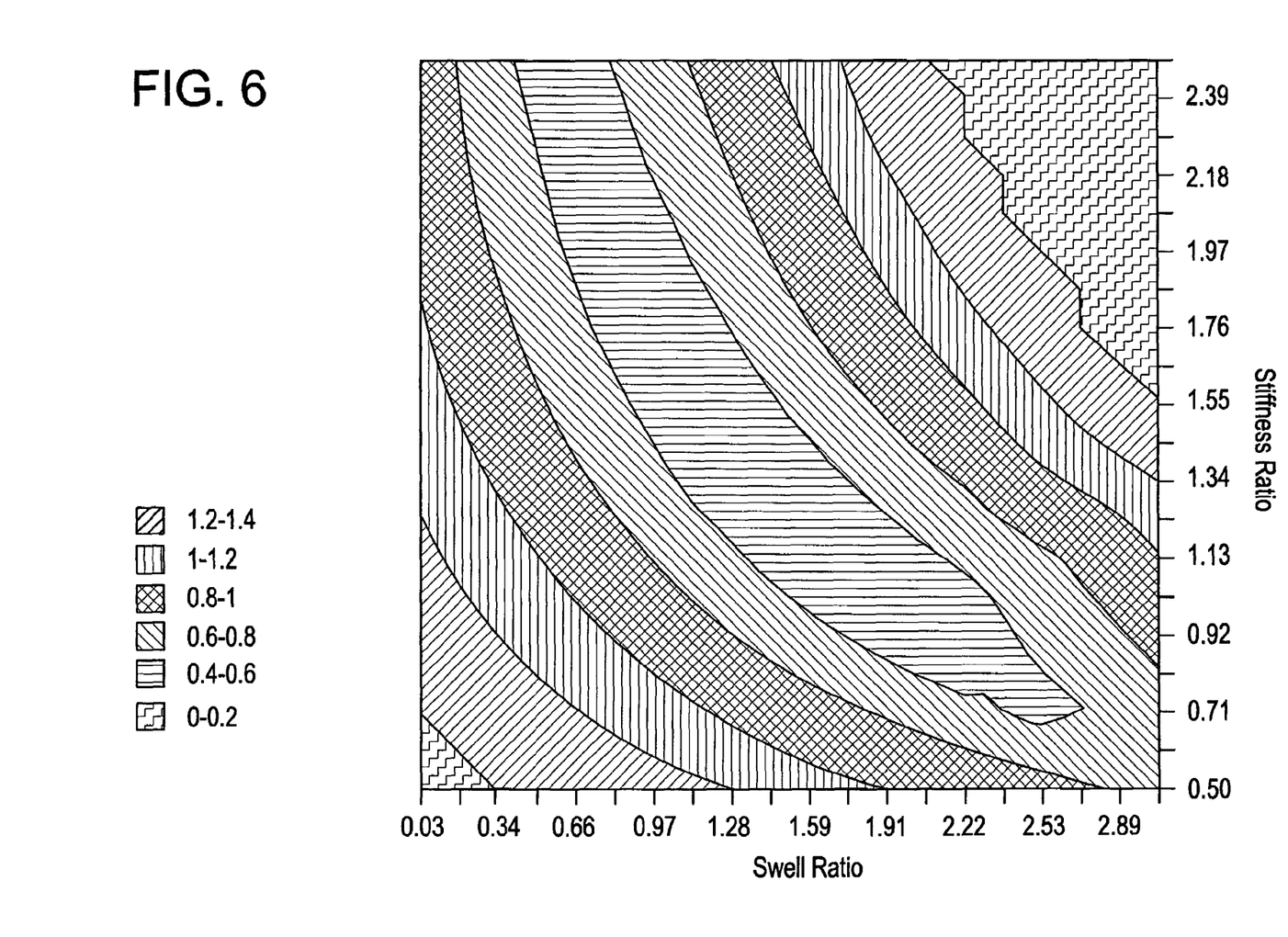
FIG. 6 is a curvature ratio contour map at a diffusion ratio of 1.5.
Figure 7:
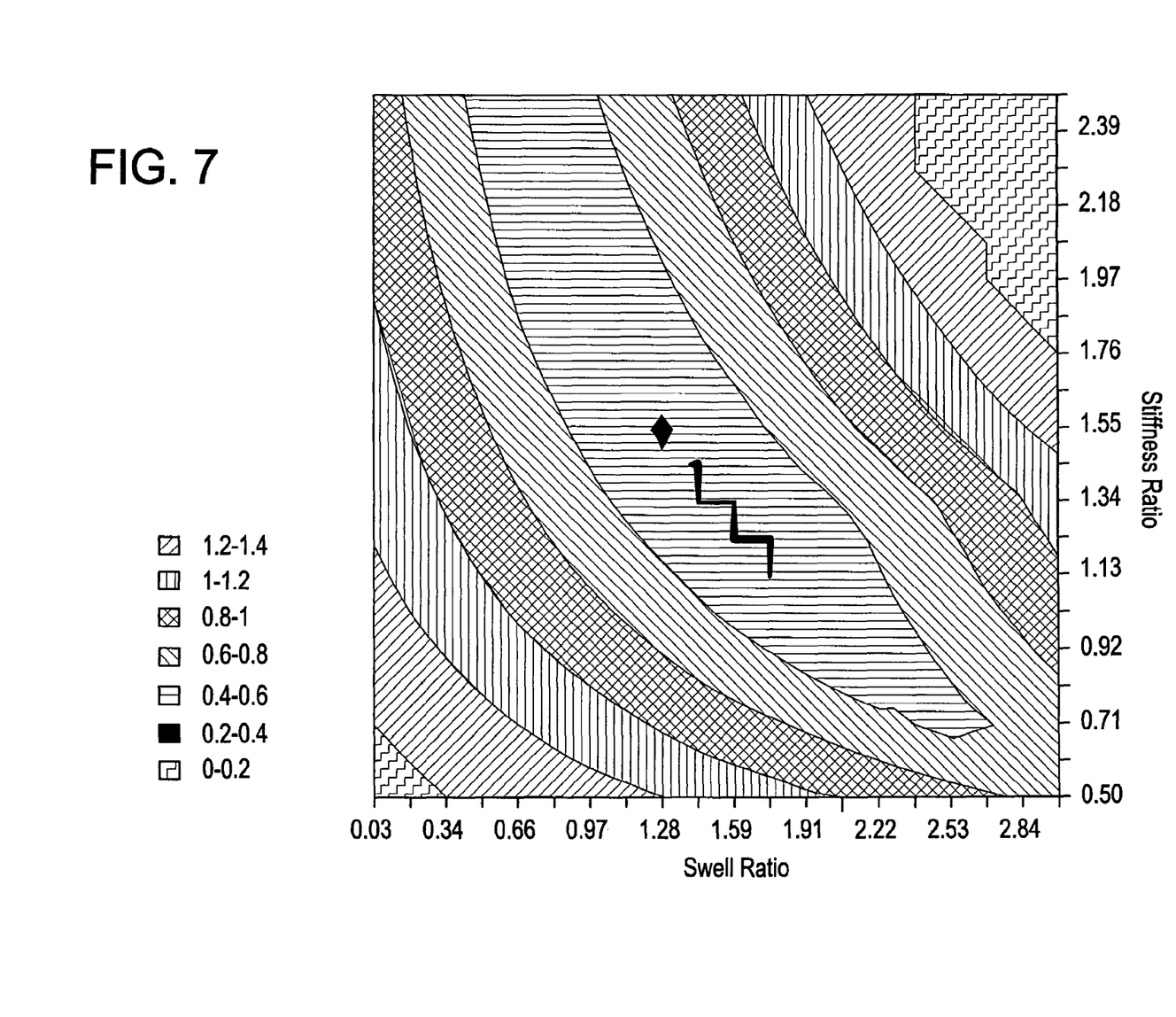
FIG. 7 is a curvature ratio contour map at a diffusion ratio of 1.0.

For a given film thickness the curvature is more sensitive to the strain ratio and stiffness ratio and less sensitive to the diffusion ratio. FIG. 6 is a contour plot outlining the normalized curvature range as a function of the stiffness ratio and strain/swell ratio. This contour plot is for a specific diffusion ratio of 1.5. The optimum curvature range is obtained for the case where the stiffness ratio is related to the strain ratio in a hyperbolic way. This hyperbolic functionality is consistent for any diffusion ratio as is supported by FIG. 7, which illustrates contour plot for a specific diffusion ratio of 1.0. Preferably, the stiffness ratio to swell ratio is within the inner contour by area 200.

Based upon the above information, the optical film can be a plastic having the desired stiffness ratio (γ) (Youngs modulus(megapascals)/(1-Poisson ratio)), swell ratio(δ) (percentage growth of the material at equilibrium), and diffusivity ratio(q), wherein all ratios refer to the ratio of the optical film to the substrate. The desired amounts of these parameters are dependent upon the thickness of the optical film. The ultimate desire is to reduce the tilt, e.g., curvature, to a radial deviation range of less than or equal to about 1.15 degrees at a radius of 55 mm, with less than or equal to about 1.0 degrees at a radius of 55 mm preferred, less than or equal to about 0.80 degrees at a radius of 55 mm more preferred, less than or equal to about 0.70 degrees at a radius of 55 mm even more preferred, less than or equal to about 0.50 degrees at a radius of 55 mm yet even more preferred, and less than or equal to about 0.25 degrees at a radius of 55 mm desired. Generally, the stiffness ratio can be greater than or equal to about 0.5, with a stiffness ratio of greater than or equal to about 0.70 preferred, and a stiffness ratio of greater than or equal to about 1.25 more preferred. Preferably, the stiffness ratio is less than or equal to about 5, with a stiffness ratio of less than or equal to about 3 preferred, and a stiffness ratio of less than or equal to about 2.5 even more preferred. The stiffness of the optical film and substrate is measured in tensile deformation at room temperature using an Instron testing machine. With respect to the swell ratio, it can be greater than or equal to about 0.50, with greater than or equal to about 0.75 preferred, and greater than or equal to about 1.0 more preferred. Preferably, the swell ratio is less than or equal to about 5, with less than or equal to about 3 more preferred, and less than or equal to about 2.5 even more preferred. The swell strain is measured using a Thermomechanical analyzer from TA instruments. The diffusivity ratio can be greater than or equal to about 0.05, with greater than or equal to about 0.10 preferred. Preferably the diffusivity is less than or equal to about 2.0, with less than or equal to about 1.0 preferred.

With respect to thickness, the optical film can have a thickness of about 0.2 micrometers to about 0.6 mm. Within the film thickness range, less than or equal to about 0.6 mm is preferred, less than or equal to about 250 micrometers is more preferred, and less than or equal to about 120 micrometers is even more preferred, in some applications. Also preferred within this range is the optical thickness of greater than or equal to about 0.2 micrometers, with greater than or equal to about 5 micrometers more preferred, and greater than or equal to about 50 micrometers even more preferred. In contrast, the substrate typically has a thickness of greater than or equal to about 0.3 mm, with greater than or equal to about 0.6 mm preferred, and greater than or equal to about 1.1 mm more preferred. Also preferred is a substrate thickness of less than or equal to about 2.5 mm, with less than or equal to about 2.0 mm more preferred, and less than or equal to about 1.5 mm even more preferred. Due to current equipment and due to industry specifications, a substrate thickness of about 1.1 mm is generally preferred. If decreased substrate thicknesses are employed (e.g., less than about 1.2 mm), it is preferred to maintain a optical film to substrate thickness ratio of less than or equal to about 1, with a thickness ratio of less than or equal to about 0.5 preferred, and less than or equal to about 0.1 more preferred. Also preferred is a thickness ratio of greater than or equal to about 0.001, with greater than or equal to about 0.005 more preferred, and greater than or equal to about 0.025 even more preferred.

Possible optical film materials that can be any plastic that exhibits appropriate properties, including thermoplastics, thermosets, as well as homopolymers, copolymers, reaction products, and combinations comprising at least one of the foregoing materials including, but not limited to addition and condensation polymers. Illustrative, non-limiting examples of thermoplastic polymers are olefin-derived polymers such as polyethylene, polypropylene, and their copolymers; chlorinated polyethylene, polyvinyl chloride, polymethylpentane; ethylene-tetrafluoroethylene copolymers, polyvinyl fluoride, polyvinylidene fluoride, polyvinylidene chloride, polytetrafluoroethylene, ethylene-vinyl acetate copolymers, polyvinyl acetate, diene-derived polymers such as polybutadiene, polyisoprene, and their copolymers; polymers of ethylenically unsaturated carboxylic acids and their functional derivatives, including acrylic polymers such as poly(alkyl acrylates), poly(alkyl methacrylates), polyacrylamides, polyacrylonitrile and polyacrylic acid; alkenylaromatic polymers such as polystyrene, poly-alpha-methylstyrene, hydrogenated polystyrenes, syndiotactic and atactic polystyrenes, polycyclohexyl ethylene, styrene-co-acrylonitrile, styrene-co-maleic anhydride, polyvinyltoluene, and rubber-modified polystyrenes; polyamides such as nylon-6, nylon-66, nylon-11, and nylon-12; polyacetals, polyesters such as polyethylene terephthalate, polybutylene terephthalate, and polycyclohexylmethylene terephthalate; polycarbonates; polyestercarbonates; high heat polycarbonates, polyethers such as polyarylene ethers especially polyphenylene ethers derived from 2,6-dimethylphenol and copolymers with 2,3,6-trimethylphenol, polyethersulfones, polyetherethersulfones, polyetherketones, polyetheretherketones, and polyetherimides; polyarylene sulfides, polysulfones, and polysulfidesulfones; and liquid crystalline polymers.

Non-limiting examples of thermosetting resins are epoxies, phenolics, alkyds, polyesters, polyimides, polyurethanes, mineral filled silicones, bis-maleimides, cyanate esters, multifunctional allylic compounds such as diallylphthalate, acrylics, alkyds, phenol-formaldehyde, novolacs, resoles, bismaleimides, PMR resins, melamine-formaldehyde, urea-formaldehyde, benzocyclobutanes, hydroxymethylfurans, and isocyanates benzocyclobutene resins, as well as homopolymers, copolymers, reaction products, and combinations comprising at least one of the foregoing thermosetting resins. In one embodiment, the thermoset polymer further comprises at least one thermoplastic polymer, such as, polyphenylene ether, polyphenylene sulfide, polysulfone, polyetherimide, polyester, and the like, as well as homopolymers, copolymers, reaction products, and combinations comprising at least one of the foregoing thermoplastic polymers. The thermoplastic polymer is typically combined with a thermoset monomer mixture before curing of the thermoset.

Both thermoplastic polyesters and thermoplastic elastomeric polyesters can be employed. Illustrative, non-limiting examples of thermoplastic polyesters include poly(ethylene terephthalate), poly(1,4-butylene terephthalate), poly(1,3-propylene terephthalate), poly(cyclohexanedimethanol terephthalate), poly(cyclohexanedimethanol-co-ethylene terephthalate), poly(ethylene naphthalate), poly(butylene naphthalate), and polyarylates. Illustrative, non-limiting examples of thermoplastic elastomeric polyesters (commonly known as TPE) include polyetheresters such as poly(alkylene terephthalate)s (particularly poly[ethylene terephthalate] and poly[butylene terephthalate]) containing soft-block segments of poly(alkylene oxide), particularly segments of poly(ethylene oxide) and poly(butylene oxide); and polyesteramides such as those synthesized by the condensation of an aromatic diisocyanate with dicarboxylic acids and a carboxylic acid-terminated polyester or polyether prepolymer.

Suitable polyarylates include, but are not limited to, the polyphthalate esters of 2,2-bis(4-hydroxyphenyl)propane (commonly known as bisphenol A), and polyesters consisting of structural units of the formula I:

(I)

wherein $R^{16}$ is hydrogen or $C_{1-4}$ alkyl, optionally in combination with structural units of the formula II:

(II)

wherein $R^{17}$ is a divalent $C_{4-12}$ aliphatic, alicyclic or mixed aliphatic-alicyclic radical. The latter polyesters may be prepared by the reaction of a 1,3-dihydroxybenzene moiety with at least one aromatic dicarboxylic acid chloride under alkaline conditions. Structural units of formula II contain a 1,3-dihydroxybenzene moiety which may be substituted with halogen, usually chlorine or bromine, or preferably with $C_{1-4}$ alkyl; e.g., methyl, ethyl, isopropyl, propyl, butyl. The alkyl groups are preferably primary or secondary groups, with methyl being more preferred, and are most often located in the ortho position to both oxygen atoms although other positions are also contemplated. The most preferred moieties are resorcinol moieties, in which $R^{16}$ is hydrogen. The 1,3-dihydroxybenzene moieties are linked to aromatic dicarboxylic acid moieties which may be monocyclic moieties, e.g., isophthalate or terephthalate, or polycyclic moieties, e.g., naphthalenedicarboxylate.

In the optional soft block units of formula II, resorcinol or alkylresorcinol moieties are present in ester-forming combination with $R^{17}$ which is a divalent $C_{4-12}$ aliphatic, alicyclic or mixed aliphatic-alicyclic radical.

Possible polycarbonates include those comprising structural units of the formula III:

(III)

wherein at least about 60 percent of the total number of $R^{18}$ groups are aromatic organic radicals and the balance thereof are aliphatic, alicyclic, or aromatic radicals. Suitable $R^{18}$ radicals include m-phenylene, p-phenylene, 4,4'-biphenylene, 4,4'-bi(3,5-dimethyl)-phenylene, 2,2-bis(4-phenylene)propane, 6,6'-(3,3,3',3'-tetramethyl-1,1'-spirobi[1H-indane]), 1,1'-bis(4-phenylene)-3,3,5-trimethylcyclohexane, and similar radicals such as those which correspond to the dihydroxy-substituted aromatic hydrocarbons disclosed by name or formula (generic or specific) in U.S. Pat. No. 4,217,438.

More preferably, $R^{18}$ is an aromatic organic radical and still more preferably a radical of the formula IV:

(IV)

wherein each $A^1$ and $A^2$ is a monocyclic divalent aryl radical and $Y^1$ is a bridging radical in which one or two atoms separate $A^1$ and $A^2$. For example, $A^1$ and $A^2$ typically represent unsubstituted phenylene or substituted derivatives thereof. The bridging radical $Y^1$ is most often a hydrocarbon group and particularly a saturated group such as methylene; cyclohexylidene; 3,3,5-trimethylcyclohexylidene; or isopropylidene. The most preferred polycarbonates are bisphenol A polycarbonates, in which each of $A^1$ and $A^2$ is p-phenylene and $Y^1$ is isopropylidene. Suitable polycarbonates may be made using various processes, including interfacial, solution, solid state, or melt processes.

In one embodiment, the storage media comprises at least one layer with at least one polycarbonate. In another embodiment, the storage media comprises at least one layer with two different polycarbonates. Homopolycarbonates derived from a single dihydroxy compound monomer and copolycarbonates derived from more than one dihydroxy compound monomer are encompassed.

In one embodiment, the substrate and/or at least one other layer of the storage media comprise a polycarbonate or copolycarbonate comprising structural units (V) or (VI):

(V)

(VI)

where $R^1$, $R^2$, $R^3$, $R^4$, $R^5$, and $R^6$ are, independently chosen from $C_1$-$C_6$ alkyl and hydrogen; $R^7$ and $R^8$ are, independently, $C_1$-$C_6$ alkyl, phenyl, $C_1$-$C_6$ alkyl substituted phenyl, or hydrogen; m is an integer of 0 to about 12; q is an integer of 0 to about 12; m+q is an integer of about 4 to about 12; n is an integer of about 1 to about 2; and p is an integer of about 1 to about 2.

Representative units of structure (V) include, but are not limited, to residues of 1,1-bis(4-hydroxy-3-methylphenyl) cyclohexane (DMBPC); 1,1-bis(4-hydroxy-3-methylphenyl)cyclopentane; 1,1-bis(4-hydroxy-3-methylphenyl)cycloheptane; 1,1-bis(4-hydroxy-3-methylphenyl)-3,3,5-trimethylcyclohexane (DMBPI); and mixtures comprising at least one of the foregoing units.

Representative units of structure (VI) include, but are not limited, to residues of 2,2-bis(4-hydroxy-3-methyl)propane (DMBPA); and 4,4'-(1-phenylethylidene)bis(2-methylphenol) (DMbisAP).

In an even further embodiment, the substrate and/or at least one other layer of the storage media can comprise polycarbonate or copolycarbonate comprises structural units (VII):

(VII)

where $R^9$, $R^{10}$, $R^{13}$ and $R^{14}$ are independently $C_1$-$C_6$ alkyl, $R^{11}$ and $R^{12}$ are independently H or $C_1$-$C_5$ alkyl, each $R^{15}$ is independently selected from H and $C_1$-$C_3$ alkyl and each n is independently selected from 0, 1 and 2.

Representative units of structure (VII) include, but are not limited to, 6,6'-dihydroxy-3,3,3',3'-tetramethyl spirobiindane (SBI); 6,6'-dihydroxy-3,3,5,3',3',5'-hexamethyl spirobiindane; 6,6'-dihydroxy-3,3,5,7,3',3',5',7'-octamethylspirobiindane; 5,5'-diethyl-6,6'-dihydroxy 3,3,3',3'-tetramethylspirobiindane, and mixtures comprising at least one of the foregoing units.

The polyphenylene ethers are polymers comprising a plurality of structural units of the formula (VIII)

(VIII)

$$\begin{array}{c}Q^2 \quad Q^1 \\ \phantom{xx} \\ Q^2 \quad Q^1\end{array} \!\!-\!\!O\!-\!$$

wherein in each of the units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer polyphenylene ethers are can be employed. Suitable copolymers include random copolymers containing such units in combination with (for example) 2,3,6-trimethyl-1,4-phenylene ether units. Also included are polyphenylene ethers containing moieties prepared by grafting onto the polyphenylene ether in a known manner such materials as vinyl monomers or polymers such as polystyrenes and elastomers, as well as coupled polyphenylene ethers in which coupling agents such as low molecular weight polycarbonates, quinones, heterocycles and formals undergo reaction in known manner with the hydroxy groups of two polyphenylene ether chains to produce a higher molecular weight polymer, provided a substantial proportion of free OH groups remains.

Particularly useful polyphenylene ethers for many purposes are those that comprise molecules having at least one aminoalkyl-containing end group. The aminoalkyl radical is typically located in an ortho position to the hydroxy group. Polymers containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of the aminoalkyl-containing and 4-hydroxybiphenyl end groups.

It will be apparent that the contemplated polyphenylene ethers include all those presently known, irrespective of variations in structural units or ancillary chemical features, including, but not limited to homopolymer and copolymer thermoplastic polymers, and mixtures comprising at least one of the foregoing polyphenylene ethers. Copolymers may include random, block or graft type. Thus, for example, suitable polystyrenes include homopolymers, such as amorphous polystyrene and syndiotactic polystyrene, and copolymers containing these species. The latter embraces high impact polystyrene (HIPS), a genus of rubber-modified polystyrenes comprising blends and grafts wherein the rubber is a polybutadiene or a rubbery copolymer of styrene in a range between about 70% by weight and about 98% by weight and diene monomer in a range between about 2% by weight and about 30% by weight. Also included are ABS copolymers, which are typically grafts of styrene and acrylonitrile on a previously formed diene polymer backbone (e.g., polybutadiene or polyisoprene). Suitable ABS copolymers may be produced by various methods.

In a preferred embodiment the optical film comprises thermoplastic resins and the substrate comprises thermosetting resins. It is also possible for the optical film to comprises thermosetting resins while the substrate comprises thermoplastic resins. Similarly it is possible for the optical film and the substrate to comprise a mixture of thermoplastic and thermosetting resins and wherein at least one element of the composition of the optical film is different from that of the substrate.

The optical layer or film can be deposited by a variety of techniques, including vapor deposition (e.g., plasma enhanced chemical vapor deposition, and the like), coating (e.g., electrodeposition coating, meniscus coating, spray coating, extrusion coating, spin coating, solution coating, and the like), casting (e.g., extrusion casting, solution casting, and the like), injection molding, film blowing, calendaring, and the like, as well as combinations comprising at least one of the foregoing techniques. Meanwhile, the substrate is typically manufactured by an extrusion, molding (e.g., injection molding, extrusion molding, compression molding, and the like), and the like, as well as combinations comprising at least one of the foregoing techniques.

Although the substrate is typically a polycarbonate material, it is clearly understood that the substrate can also comprise any plastic mentioned above in relation to the optical film. For example, the substrate can comprise thermoplastics wherein the thermoplastic is bisphenol A polycarbonate, copolyester polycarbonate of bisphenol A and dodecanoic acid containing 7 mole % of polyester and 93 mole % of bisphenol A polycarbonate, 39 mole % of polyphenylene ether and 61 mole % polystyrene, 1,3-bis(4-hydroxyphenyl methane), 90 mole % bisphenol A and 10 mole % disecbutyl bisphenol A, polycarbonate of tetramethyl cyclobutanediol and high flow polycarbonate tetra xylyl hydroquinone diphosphite, and the like, as well as mixtures comprising at least one of the foregoing thermoplastics. Similarly, the optical layer can comprise thermoplastics including 80 wt % isophthalate terephthalate resorcinol-20 wt % polycarbonate, styrene acrylonitrile, bisphenol A polycarbonate, copolyester polycarbonate of bisphenol A and dodecanoic acid containing 7 mole % of polyester and 93 mole % of bisphenol A polycarbonate, 39 mole % of polyphenylene ether and 61 mole % polystyrene, 1,3-bis(4-hydroxyphenyl methane), 90 mole % bisphenol A and 10 mole % disecbutyl bisphenol A, polycarbonate of tetramethyl cyclobutanediol and high flow polycarbonate tetra xylyl hydroquinone diphosphite, and the like, as well as reaction products and mixtures comprising at least one of the foregoing thermoplastics. Furthermore, the film for these high density formats preferably has optical properties such as in-plane retardations of less than or equal to about 10 nanometers (nm). The films also have low thickness non-uniformity and surface roughness. For a 100 micrometer film, thickness uniformity at length scales longer than 2 centimeters (cm) is on the order of less than or equal to about 2 micrometers and the surface roughness at the 1 millimeter (mm) length scale is on the order of less than or equal to about 40 nm.

The substrate may further include energy absorption. Dampening can be achieved through a variety of approaches such as by addition of an energy absorbing component or through slip mechanisms involving various fillers and reinforcing agents. Useful materials that may improve the damping characteristics include elastic materials with high damping capabilities (e.g., a damping coefficient of greater than or equal to about 0.05), such as vulcanized rubbers, acrylic rubbers, silicone rubbers, butadiene rubbers, isobutylene rubbers, polyether rubbers, isobutylene-isoprene copolymers and isocyanate rubber, nitrile rubbers, chloroprene rubbers, chlorosulfonated polyethylene, polysulfide rubbers and fluorine rubber, block copolymers including polystyrene-polyisoprene copolymers such as described in U.S. Pat. No. 4,987,194, thermoplastic elastomeric materials, including polyurethanes, and combinations comprising at least one of the foregoing, among others. Vibration-damping materials also include resins in which large amounts of particles (such as ferrites, metals, ceramics, and the like), flakes (such as of talc, mica and the like), and various fibers (such as zinc oxide, wollastonite, carbon fibers, glass fibers, and the like), and mixtures comprising at least one of the foregoing, can be employed. Microfibers, fibrils, nanotubes, and whiskers, foamed and honeycombed structures may also be useful as are various combinations of the foregoing.

Beside the optical layer, which is typically the top layer, other layers which may be applied to the substrate may include one or more data storage layer(s), lubricating layer(s), adhesive layer(s), dielectric layer(s), reflective layer(s), insulating layer(s), combinations comprising at least one of these layers, and others. The data storage layer(s) may comprise any material capable of storing retrievable data, such as an optical layer, magnetic layer, or more preferably a magneto-optic layer, having a thickness of less than or equal to about 600 Å, with a thickness of less than or equal to about 300 Å preferred. Possible data storage layers include, but are not limited to, oxides (such as silicone oxide), rare earth element transition metal alloy, nickel, cobalt, chromium, tantalum, platinum, terbium, gadolinium, iron, boron, as well as alloys and combinations comprising at least one of the foregoing, and others, such as organic dye (e.g., cyanine or phthalocyanine type dyes), and inorganic phase change compounds (e.g., TeSeSn or InAgSb). The data layer may comprise grooves, channels, projections, depressions, ruts, lands, protrusions, pits. etc. ("surface features"; see FIG. 2, data layer 102). Preferably, the data layer has a coercivity of greater than or equal to about 1,500 oersted, with a coercivity of greater than or equal to about 3,000 oersted especially preferred.

The dielectric layer(s) which are often employed as heat controllers, can typically have a thickness of up to or exceeding about 1,000 Å and as low as about 200 Å. Possible dielectric layers include nitrides (e.g., silicon nitride, aluminum nitride, and others); oxides (e.g., aluminum oxide); carbides (e.g., silicon carbide); and combinations comprising at least one of the foregoing dielectric layers, among other materials compatible within the environment and preferably not reactive with the surrounding layers.

The reflective layer(s) should have a sufficient thickness to reflect a sufficient amount of energy to enable data retrieval. Typically the reflective layer(s) can have a thickness of up to and sometimes exceeding about 700 Å, with a thickness of about 300 Å to about 600 Å generally preferred.

Possible reflective layers include any material capable of reflecting the particular energy field, including metals (e.g., aluminum, silver, gold, titanium, and alloys and mixtures comprising at least one of the foregoing materials and others). The reflective layers may be disposed on the substrate by various techniques such as sputtering, chemical vapor deposition, electroplating and the like.

Optionally disposed between the optical layer and the data storage layer, and/or between other layers, is an adhesive layer that can, for example, adhere the optical film to the other layers supported by the substrate. The adhesive layer can also be employed to enhance the dampening of the disc, with the thickness and nature of the adhesive determining the amount of dampening provided by the layer. The adhesive layer, which can have a thickness of up to about 50 micrometers ($\mu m$) or so, with thicknesses of about 1 micrometers to about 30 micrometers preferred, can comprise rubber based or elastomeric thermosets, flexible thermoplastics, and the like. Typical adhesives are rubber-based or rubberlike materials, such as natural rubber or silicone rubber or acrylic ester polymers, and the like. Non-rigid polymeric adhesives such as those based on rubber or acrylic polymers and the like have some of the properties of elastomers, such as flexibility, creep resistance, resilience, and elasticity, and do provide useful dampening to enhance the quality of playback of the data storage disc. The chemistry of non-rigid polymeric adhesives is diverse, and includes polymers of the types of materials described herein as elastomers and rubbers, as flexible thermoplastics, and as thermoplastic elastomers. Suitable examples of such adhesives include polyisoprene, styrene butadiene rubber, ethylene propylene rubber, fluoro vinyl methyl siloxane, chlorinated isobutene-isoprene, chloroprene, chlorinated polyethylene, chlorosulfonated polyethylene, butyl acrylate, expanded polystyrene, expanded polyethylene, expanded polypropylene, foamed polyurethane, plasticized polyvinyl chloride, dimethyl silicone polymers, methyl vinyl silicone, polyvinyl acetate, and the like, as well as compositions comprising at least one of the foregoing adhesives. This layer may also comprise any combination comprising at least one of the above adhesives. Typically pressure sensitive adhesives are preferred for use in data storage disc applications. The adhesive layer may be added to the data storage disc by methods such as vapor deposition, spin casting, solution deposition, injection molding, extrusion molding, and the like.

In addition to the data storage layer(s), dielectric layer(s), protective layer(s) and reflective layer(s), other layers can be employed such as lubrication layer and others. Useful lubricants include fluoro compounds, especially fluoro oils and greases, and the like.

Figure 8:
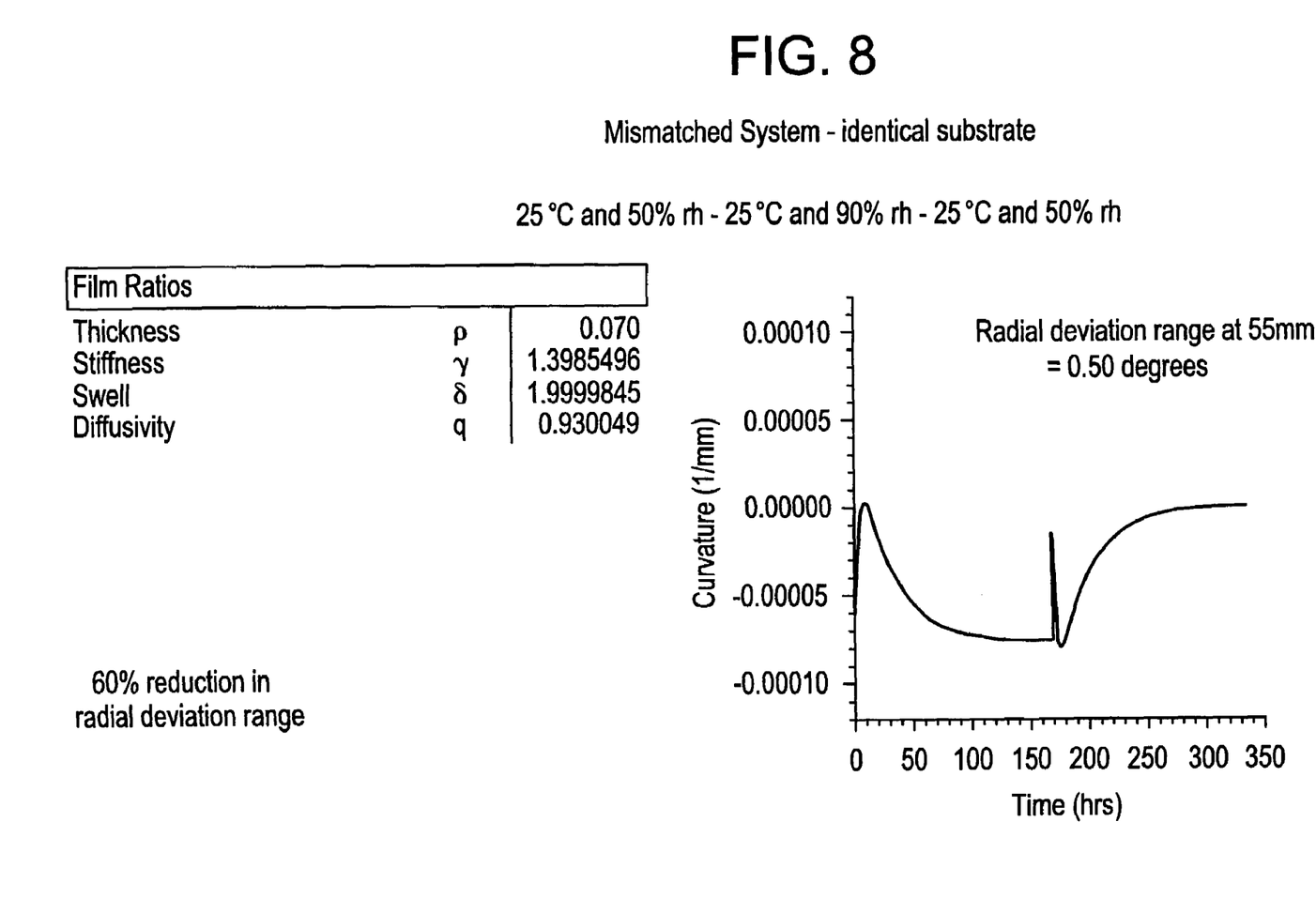
FIG. 8 is a graphical illustration of curvature change induced by a humidity set from 25° C. and 50% relative humidity (rh) to 25° C. and 90% rh for a mismatched system (e.g., same substrate as FIG. 3 with a different composition film than substrate).

The storage media disclosed herein reduces tilt as compared to a substrate without an optical layer and/or a substrate with a matched optical layer (e.g., where the optical layer comprises the same material as the substrate) by controlling the thickness and/or mismatching the optical layer and substrate compositions. Some of the advantages are illustrated in FIG. 8, which shows a substantial reduction in radial deviation (i.e., a deviation of 0.50 degrees) versus the matched system of FIG. 3 (e.g., a radial deviation of 1.26 degrees). Note, FIGS. 3 and 8 employ the same substrate with different optical layers. In FIG. 3, numbers 1-3 relate to samples comprising polycarbonate substrate and optical layer with a pressure sensitive adhesive disposed therebetween, while samples 10, 20, 30, and 40 employ a polycarbonate substrate and optical layer with a UV curable adhesive.

EXAMPLE 1

In this example (simulated) Bisphenol A Polycarbonate (BPA-PC) was retained as the substrate material, while isophthalate terephthalate resorcinol-polycarbonate (ITR-PC 80-20) blend, styrene acrylonitrile (SAN 576) or BPA-PC was chosen as the optical film. The optical film has a thickness of about 100 micrometers while the substrate has a thickness of 1.1 millimeters giving a film to substrate thickness ratio of 0.09.

Both the substrate and optical film stiffness were measured in tensile deformation at room temperature using an Instron tensile testing machine. The swell of a polymeric material as defined herein is the percentage of volume growth of the totally dry material when subjected to a 100% relative humidity environment at a specific temperature. The swell is measured utilizing a TMA 2940 Thermomechanical Analyzer from TA instruments. A film is mounted under a very low constant load and initially held in a dry atmosphere. The length change is then measured upon absorption of water when the material is exposed to 100% relative humidity. The water strain or swell is taken to be the strain of the material (length change divided by the original gauge length).

Table 2 below outlines the stiffness and swell ratio of the film to substrate as well as the radial tilt range for the different material combinations. It can be clearly seen that when polymeric materials chosen for the optical film and the substrate are different from each other, the radial tilt range is much smaller than for the purely matched material system where BPA-PC alone is used as material for the substrate and optical film

TABLE 2

| Film Material | Stiffness ratio (film to substrate) | Swell ratio (film to substrate) | Radial Tilt Range (degrees) |
|---|---|---|---|
| ITR-PC 80-20 | 1.101 | 1.781 | 0.292 |
| SAN 576 | 1.378 | 1.649 | 0.236 |
| BPA-PC | 1.000 | 1.000 | 0.560 |

Generally an optical film that is stiffer and has a greater swell (water strain) than the substrate material will have better performance when compared to a matched film/substrate system.

EXAMPLE 2

In this example BPA-PC is the polymeric material used for the optical film and different polymeric materials were used as the substrate as shown in Table 2. The optical film has a thickness of about 100 micrometers while the substrate has a thickness of 1.1 millimeters giving a film to substrate thickness ratio of 0.09. The substrate materials are listed as follows: copolyester polycarbonate of Bisphenol A and dodecanoic acid containing 7 mole % of polyester and 93 mole % of BPA-PC (RL -7553), 39 mole % of polyphenylene ether and 61 mole % polystyrene (PPE/PS 101), 1,3-bis(4-hydroxyphenyl methane) (BHPM), 90 mole % bisphenol A and 10 mole % disecbutyl bisphenol A (BPA disecbutyl BPA), polycarbonate of tetramethyl cyclobutanediol (TMCBD-PC) and blend of BPA-polycarbonate with polycarbonate tetra xylyl hydroquinone diphosphite (BPA-PC+1 wt % TXHQDR).

TABLE 3

| Substrate Material | Stiffness ratio (film to substrate) | Swell ratio (film to substrate) | Radial Tilt Range (degrees) |
|---|---|---|---|
| RL 7553 (SPOQ) | 1.311 | 1.209 | 0.297 |
| PPE/PS 101 39%/61% | 0.744 | 2.141 | 0.196 |
| BHPM | 1.000 | 1.724 | 0.208 |
| BPA-disecbutyl BPA 90-10 | 0.908 | 1.560 | 0.284 |
| TMCBD-PC | 1.478 | 2.451 | 0.167 |
| BPA-PC + 1 wt % TXHQDP | 1.188 | 1.200 | 0.339 |
| BPA-PC | 1.000 | 1.000 | 0.560 |

Both the substrate and optical film stiffness were measured in tensile deformation at room temperature using an Instron tensile testing machine. The swell of a polymeric material as defined herein is the percentage of volume growth of the totally dry material when subjected to a 100% relative humidity environment at a specific temperature. The swell is measured utilizing a TMA 2940 Thermomechanical Analyzer from TA instruments. A film is mounted under a very low constant load and initially held in a dry atmosphere. The length change is then measured upon absorption of water when the material is exposed to 100% relative humidity. The water strain or swell is taken to be the strain of the material (length change divided by the original gauge length). Table 3 above outlines the stiffness and swell ratio of the film to substrate as well as the radial tilt range for the different material combinations. Once again it can be seen that when the polymeric material used as the optical film differs from that used for the substrate, the radial tilt range is significantly decreased which in turn allows for the increased storage capacity.

EXAMPLE 3

In this example, BPA-PC was replaced in both the optical film and substrate by different materials as indicated in Table 4 below. The optical film has a thickness of about 100 micrometers, while the substrate has a thickness of 1.1 millimeter giving a film to substrate thickness ratio of 0.09.

TABLE 4

| Film Material | Substrate Material | Stiffness ratio (film to substrate) | Swell ratio (film to substrate) | Radial Tilt Range (degrees) |
|---|---|---|---|---|
| PS 101 | PPE/PS 101 39%/61% | 1.039 | 0.010 | 0.154 |
| BHPM | PPE/PS 101 39%/61% | 1.000 | 2.935 | 0.142 |

Here the optical film was polystyrene (PS) in one case while 1,3-bis(4-hydroxyphenyl methane) (BHPM) was used in the other. A blend of 39 mole % of polyphenylene ether and 61 mole % polystyrene was used as the substrate in both cases. Both the substrate and optical film stiffness were measured in tensile deformation at room temperature using an Instron tensile testing machine. The swell of a polymeric material as defined herein is the percentage of volume growth of the totally dry material when subjected to a 100% relative humidity environment at a specific temperature. The swell is measured utilizing a TMA 2940 Thermomechanical Analyzer from TA instruments. A film is mounted under a very low constant load and initially held in a dry atmosphere. The length change is then measured upon absorption of water when the material is exposed to 100% relative humidity. The water strain or swell is taken to be the strain of the material (length change divided by the original gauge length). Table 4 above outlines the stiffness and swell ratio of the film to substrate as well as the radial tilt range for the different material combinations. Once again it can be seen that when the polymeric material used as the optical film differs from that used for the substrate, the radial tilt range is significantly decreased which in turn allows for the increased storage capacity.

The storage media disclosed herein reduces radial tilt by mismatching the compositions of the optical film and substrate, and by optionally employing mis-matched thicknesses of the substrate and optical film. The mis-matched compositions contribute in enabling higher areal density storage (about 20 GB or greater) when compared to a disc without a mis-matched composition of the optical film and the substrate.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A storage media, comprising:
   a plastic substrate having a substrate composition and a substrate thickness;
   an optical layer having an optical layer composition different from the substrate composition;
   a reflective layer disposed between the optical layer and the substrate; and
   an adhesive layer disposed between the optical layer and the reflective layer;
   wherein the storage media has a radial deviation over time of less than or equal to 1.15 degrees at a radius of 55 mm, when exposed to a cycle at 25° C. of 50% relative humidity—90% relative humidity—50% relative humidity.

2. The storage media of claim 1, wherein a stiffness ratio of the optical layer to the substrate is about 0.5 to about 5 measured in tensile deformation at room temperature.

3. The storage media of claim 1, wherein a swell ratio of the optical layer to the substrate is about 0.5 to about 5.0.

4. The storage media of claim 1, wherein the optical layer has a layer thickness of greater than or equal to about 20% of the substrate thickness.

5. The storage media of claim 1, wherein the optical layer has a layer thickness of about 0.2 micrometers to about 0.6 mm.

6. The storage media of claim 1, wherein the substrate thickness is about 0.3 mm to about 1.1 mm.

7. The storage media of 1, wherein the optical layer has a layer thickness, and a thickness ratio of the layer thickness to the substrate thickness is less than or equal to about 1.

8. The storage media of claim 1, wherein at least one of the substrate composition and the optical layer composition comprises residues of 1,1-bis(4-hydroxy-3-methylphenyl) cyclohexane.

9. The storage media of claim 1, wherein the substrate comprises polycarbonate.

10. The storage media of claim 1, wherein the optical layer composition is selected from the group consisting of polycarbonates, acrylic polymers, epoxies, silicones, and copolymers and combinations comprising at least one of the foregoing optical layer compositions.

11. A storage media, comprising:
a plastic substrate having a substrate composition and a substrate thickness;
an optical layer having an optical layer composition different from the substrate composition, wherein the optical layer composition is selected from the group consisting of acrylic polymers, epoxies, and copolymers and combinations comprising at least one of the foregoing optical layer compositions;
a reflective layer disposed between the optical layer and the substrate; and
an adhesive layer disposed between the optical layer and the reflective layer;
wherein the storage media has a radial deviation over time of less than or equal to 1.15 degrees at a radius of 55 mm, when exposed to a cycle at 25° C. of 50% relative humidity—90% relative humidity—50% relative humidity.

12. The storage media of claim 10, wherein the optical layer composition comprises polycarbonate and poly(alkyl acrylate).

13. The storage media of claim 1, wherein the radial deviation is less than or equal to about 1.0 degree.

14. The storage media of claim 13, wherein the radial deviation is less than or equal to about 0.5 degrees.

15. The storage media of claim 1, wherein the substrate further comprises grooves.

16. The storage media of claim 1, wherein the storage media is a DVD.

17. A DVD, comprising:
a plastic substrate having a substrate composition and a substrate thickness of about 0.3 mm to about 1.1 mm;
an optical layer having an optical layer composition different from the substrate composition, wherein at least one of the substrate composition and the optical layer composition comprises residues of 1,1-bis(4-hydroxy-3-methylphenyl)cyclohexane; and
a reflective layer and an adhesive layer disposed between the substrate and the optical layer;
wherein the DVD has a radial deviation over time of less than or equal to 1.15 degrees at a radius of 55 mm, when exposed to a cycle at 25° C. of 50% relative humidity—90% relative humidity—50% relative humidity.

18. The DVD of claim 17, further comprising a stiffness ratio of the optical layer to the substrate of about 0.5 to about 5 measured in tensile deformation at room temperature, and a swell ratio of the optical layer to the substrate of about 0.5 to about 5.0.

19. The DVD of claim 18, wherein the substrate composition comprises polycarbonate or a polycarbonate copolymer.

20. A storage media, comprising:
a plastic substrate having a substrate composition and a substrate thickness;
an optical layer having an optical layer composition different from the substrate composition;
an adhesive layer disposed between the optical layer and the plastic substrate;
wherein the storage media has a radial deviation over time of less than or equal to 1.15 degrees at a radius of 55 mm, when exposed to a cycle at 25° C. of 50% relative humidity—90% relative humidity—50% relative humidity; and
wherein the storage media is capable of reflecting a particular energy field.

21. The storage media of claim 20, wherein at least one of the substrate composition and the optical layer composition comprises residues of 1,1-bis(4-hydroxy-3-methylphenyl) cyclohexane.

22. The storage media of claim 21, wherein the substrate comprises polycarbonate.

23. The storage media of claim 22, wherein the optical layer composition is selected from the group consisting of acrylic polymers, epoxies, and copolymers and combinations comprising at least one of the foregoing optical layer compositions.

24. The storage media of claim 20 wherein the optical layer composition comprises polycarbonate and poly(alkyl acrylate).

* * * * *